(12) United States Patent
Mackenzie et al.

(10) Patent No.: US 11,738,660 B2
(45) Date of Patent: Aug. 29, 2023

(54) ISOLATION CHARGING FOR MULTIPLE AC CHARGING INPUTS

(71) Applicant: Ford Global Technologies, LLC, Dearborn, MI (US)

(72) Inventors: Kevin Mackenzie, Canton, MI (US); Theodore Joseph Filippi, Brownstown, MI (US); Jonathan Barker, Detroit, MI (US); William Arthur Paxton, Redwood City, CA (US); Christopher W. Bell, Livonia, MI (US); John Marshall Penney, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 148 days.

(21) Appl. No.: 17/332,305

(22) Filed: May 27, 2021

(65) Prior Publication Data
US 2022/0379766 A1  Dec. 1, 2022

(51) Int. Cl.
| | | |
|---|---|---|
| H02J 7/00 | (2006.01) |
| B60L 53/66 | (2019.01) |
| B60L 53/20 | (2019.01) |
| H02J 7/02 | (2016.01) |
| B60R 16/023 | (2006.01) |
| B60L 53/14 | (2019.01) |
| B60K 6/28 | (2007.10) |
| B60L 53/12 | (2019.01) |

(52) U.S. Cl.
CPC .............. *B60L 53/66* (2019.02); *B60L 53/20* (2019.02); *H02J 7/02* (2013.01); *B60K 6/28* (2013.01); *B60L 53/12* (2019.02); *B60L 53/14* (2019.02); *B60R 16/0231* (2013.01); *B60Y 2200/91* (2013.01); *B60Y 2200/92* (2013.01); *B60Y 2300/91* (2013.01)

(58) Field of Classification Search
CPC .......... B60L 53/12; B60L 53/14; B60L 53/20; B60L 53/66; B60Y 2200/91; B60Y 2200/92; B60Y 2300/91; B60K 6/28; B60R 16/0231; H02J 7/02
USPC .............................................. 320/109; 701/22
See application file for complete search history.

(56) References Cited

U.S. PATENT DOCUMENTS

| | | | |
|---|---|---|---|
| 9,827,863 B2 | 11/2017 | Bartz et al. | |
| 2015/0357851 A1* | 12/2015 | Huang | H02J 7/02 320/108 |
| 2018/0105060 A1 | 4/2018 | McQuillen et al. | |
| 2019/0106007 A1 | 4/2019 | Spesser | |
| 2020/0304026 A1* | 9/2020 | Mu | H02J 7/02 |
| 2020/0391606 A1* | 12/2020 | Noh | B60L 53/62 |

* cited by examiner

*Primary Examiner* — Zixuan Zhou
(74) *Attorney, Agent, or Firm* — David B. Kelley; Brooks Kushman P.C.

(57) ABSTRACT

An automotive controller drives a plurality of relays to a first position or a second position depending on which of a first port and second port, that are both arranged to provide electrical power, has greater electrical power such that a traction battery receives current from the one of the first port and second port delivering the greater electrical power but not the other of the first port and second port.

13 Claims, 4 Drawing Sheets

ISOLATION CHARGING FOR MULTIPLE AC CHARGING INPUTS

TECHNICAL FIELD

The present disclosure relates to systems and methods of charging a vehicle battery.

BACKGROUND

As the volume of electric vehicles increases year over year, additional charging features will be desired such as multiple charge ports for convenience or automated charging systems that connect to a different location on the vehicle such as on the underbody.

SUMMARY

One embodiment is a vehicle. The vehicle has a traction battery and a controller. The traction battery is electrical communication with a high-voltage electrical bus network. The high-voltage bus network is configured to receive a first electrical current value from a first port when the plurality of relays are in a first position and to receive a second electrical current value from a second port when the plurality of relays are in a second position. The controller is programmed to, in response presence of a first ready signal at the first port, drive the plurality of relays to the first position. The controller is further programmed to, in response to presence of a second ready signal at the second port, drive the plurality of relays to the second position.

DETAILED DESCRIPTION

Figure 1:
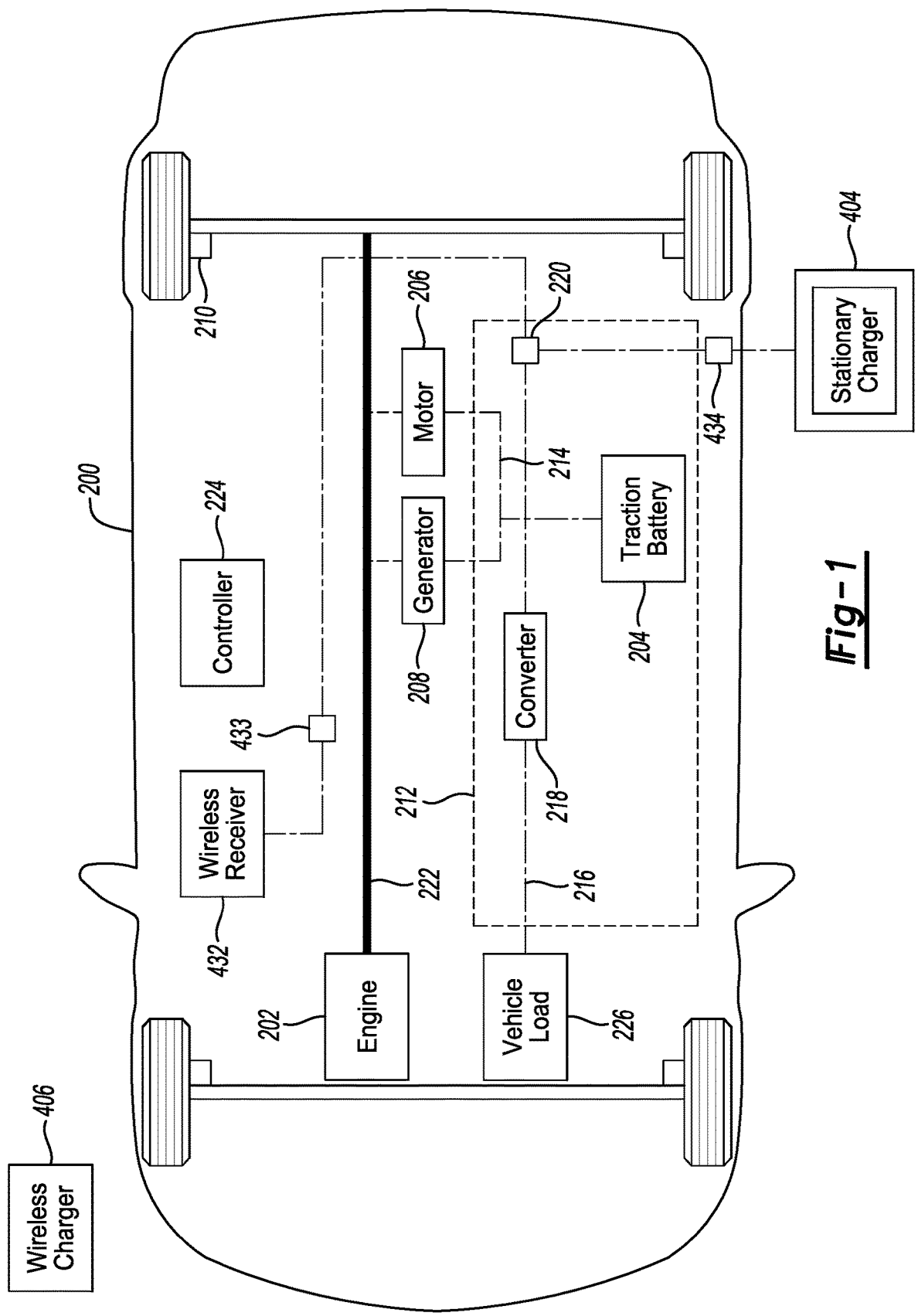
FIG. 1 illustrates a vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Simple and cost effective ways for adding additional AC inputs without modifications to high volume onboard chargers or major changes to electrical architectures are desired. One common charger comprises four main connection lines that run from the charge port to the onboard charger. A ground is terminated to chassis near the charge port and near the onboard charger. These charging systems, however, are not suitable for multiple charging stations. Strategies are discussed herein for adding additional AC inputs. Before discussing these in detail however, a general overview of the vehicle environment is provided.

A vehicle may include an internal combustion engine. The engine may be used to provide torque to a propulsion system within a vehicle. The engine may convert chemical energy from a fuel source into mechanical energy. In particular, the engine may provide mechanical energy in the form of rotational energy exerted upon a crankshaft. The engine may be configured to provide the mechanical energy to a transmission through the crankshaft. The engine may be in communication with a vehicle controller. The engine may include a plurality of sensors. One of the sensors may determine and provide engine parameters to a vehicle controller. For example, an engine sensor may determine and provide engine speed, fuel economy, lubricant level, or other engine parameters.

The vehicle may include a vehicle battery. The vehicle battery may be used to provide torque to a propulsion system within a vehicle. The vehicle battery may be a traction battery. The vehicle battery may be used to store electrical energy. Further, the vehicle battery may be used to convert the stored electrical energy into mechanical energy to propel the vehicle. The vehicle battery may include a plurality of battery cells. In some embodiments, at least two of the battery cells are in series. In such embodiments, the electrical potential of both of the battery cells may be summed. Alternatively, or additionally, at least two of the battery cells are in parallel. In such embodiments, the electrical current capacity may be summed. The vehicle battery may have a plurality of sensors. One of the sensors may determine and provide battery parameters to a vehicle controller.

The vehicle may include a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine. Alternatively, the vehicle may have a clutch between the drivetrain and the internal combustion engine.

The vehicle may include a regenerative braking system. The regenerative braking system may be in mechanical communication with a plurality of vehicle wheels. The regenerative braking system may be used to convert mechanical energy into electrical energy. For example, the regenerative braking system may be used to convert inertia from braking into electrical energy by using in part, a magnet, to reduce the absolute velocity of a vehicle. Changing magnetic flux may produce an electrical current. The regenerative braking system may be configured to provide the electrical current to an electrical component of the vehicle. For example, the regenerative braking system may be in electrical communication with a vehicle battery, such that the regenerative braking system is configured to produce electricity from inertia gathered from the mechanical communication with the vehicle wheels. Electricity gathered from the regenerative braking system may be converted by the converter such that its electrical parameters are suited for either of the high-voltage and low-voltage electrical bus networks. Alternatively, the regenerative braking system may be configured to produce electricity having electrical parameters suited for either of the high-voltage and low-voltage electrical bus networks.

The vehicle may include a generator. The generator may be configured to convert mechanical energy into electrical energy. In some embodiments, the generator may be configured to convert mechanical energy from an internal combustion engine into electrical energy for charging a vehicle battery. The generator may also be used to convert mechanical energy from an internal combustion engine into electrical energy for powering a vehicle load. The generator may be configured to output DC electricity.

The vehicle may include a power network. The power network may be configured to facilitate the electrical communication between power electronics within a vehicle. The power network may use a plurality of electrical bus networks to facilitate the communication. One of the electrical bus networks may be a high-voltage bus network. The high-voltage bus network may be configured to provide DC electricity to electrical components requiring a high voltage. For example, the high-voltage bus network may be configured to have an electrical potential difference of 500 volts. The high-voltage bus network may be configured to be in direct electrical communication with a vehicle battery. Another of the electrical bus networks may be a low-voltage bus network. The low-voltage bus network may be configured to provide DC electricity to electrical components that require a low voltage. For example, the low-voltage bus network may be configured to have an electrical potential difference of 12 volts. The low-voltage bus network may be in direct electrical communication with a supplementary battery.

The power network may have a converter. The converter may be configured to convert electricity of a first set of electrical parameters into a second set of electrical parameters. For example, the converter may be configured to convert electricity at 500 volts into electricity at 12 volts. The power network may include a common ground. The ground may be configured to act as a source of low electrical potential to facilitate the flow of electrical current. In some embodiments, the high-voltage bus network shares a common ground with the low-voltage bus network. Alternatively, the power network may have a plurality of electrical grounds.

The power network may include a converter. The converter may be configured to alter electricity of a first set of parameters into electricity of a second set of parameters. In one embodiment, the converter may convert high voltage electricity into low voltage electricity. For example, the converter may convert 480 volts into 24 volts. Additionally, or alternatively, the converter may convert electricity at 24 volts into electricity at 480 volts. The converter may be bidirectional regarding direction of conversion. In some embodiments, the converter may be configured to vary its conversion. In such examples, the converter may be configured to change its conversion in response to a command from a controller. For example, the converter may be configured to convert 480 volts into 24 volts in response to a first command from a controller, and further configured to convert 480 volts into 12 volts in response to a second command from the controller.

The power network may include an onboard charger. The onboard charger may be configured to charge a vehicle battery. The onboard charger may include an input and an output. The input of the onboard charger may be in electrical communication with the high-voltage bus network. The onboard charger may be configured to receive electricity from the high-voltage bus network via the input and modify said electricity's parameter such that the output may provide suitable electricity to the vehicle battery. For example, an onboard charger may be configured to convert electricity at 500 volts to electricity at 50 volts. Another example may be converting AC electricity into DC electricity. The onboard charger may be configured to receive electricity of various electrical parameters. For example, the onboard charger may be configured to receive DC electricity or AC electricity. The onboard charger may be configured to vary the electrical parameters provided from the output. The onboard charger may include a plurality of charger conductors. The plurality of charger conductors may include a central charging phase charging conductor, a leading phase charging conductor, and a lagging phase charging conductor. Additionally, the plurality of charger conductors may include a neutral charger conductor. The plurality of charger conductors may be configured to receive 0° phase, +120° phase, and −120° phase electric current.

The power network may be configured to interact with a stationary charger. The stationary charger may be configured to connect to the power network through a charging interface. The stationary charger may be configured to provide electricity of varying electrical parameters. For example, the stationary charger may be configured to provide electricity of a first set of electrical parameters, wherein the electricity has a potential of 240 volts and an electrical current of 10 amps, providing an electrical power of 2400 watts, and further configured to provide electricity of a second set of electrical parameters, wherein the electricity has a potential of 240 volts and an electrical current of 5 amps, providing an electrical power of 1200 watts. The stationary charger may have a plurality of discreet sets of electrical parameters. Alternatively, the stationary charger may increase and decrease an electrical parameter in an analog pattern. The stationary charger may be in electrical communication with a power grid. The stationary charger may be configured to convert electricity having alternating current provided by the power grid into electricity having direct current for reception of the vehicle. In embodiments as such, the stationary charger may provide electricity on a plurality of stationary conductors. The plurality of stationary conductors may include a central phase stationary conductor, a leading phase stationary conductor, and a lagging phase stationary conductor. Each of the conductors of the plurality of stationary conductors may receive electrical current of varying phases. For example, the central phase stationary conductor may have electrical current of 0° phase, the leading phase stationary conductor may have electrical current of +120° phase, and the lagging phase stationary conductor may have electrical current of −120° phase. Additionally, the stationary charger may include a neutral stationary conductor. The plurality of stationary conductors may be configured to be in direct electrical communication with a plurality of interface conductors. The central phase stationary conductor may be configured to be in direct electrical communication with a central phase interface conductor of the charging interface. The leading phase stationary conductor may be configured to be in direct electrical communication with a leading phase interface conductor of the charging interface. The lagging phase stationary conductor may be configured to be in direct electrical communication with a lagging phase interface conductor of the charging interface. The neutral stationary conductor may be configured to be in direct electrical communication with a neutral interface conductor. The phases of the each of the conductors of the plurality of stationary conductors may be transferred to each of the conductors of the plurality of interface conductors. Additionally, or alternatively, the charging interface may be configured to alter electricity to have phases of various phase. For example, the interface may receive single phase current and convert it into 0° phase, +120° phase, and −120° phase electricity.

The power network may be configured to act with a wireless charger. The wireless charger may be configured to connect to the power network through magnetic waves. As such, the power network may include a wireless receiver. The wireless receiver may be configured to convert magnetic waves into electrical current. The wireless receiver may be configured to convert the magnetic waves from the wireless charger into electrical current to provide power to the network. The wireless charger may be configured to provide magnetism of varying magnetic parameters. The wireless charger may be configured to provide magnetic waves of a first set of magnetic parameters such that upon conversion, the wireless receiver produces 10 amps, and further configured to provide magnetic waves of a second set of magnetic parameters such that upon conversion, the wireless receiver produces 5 amps. The wireless receiver may be configured to provide electricity of varying electrical parameters. For example, the wireless receiver may be configured to provide electricity at 240 volts, and further configured to provide electricity at 120 volts. Similar to the stationary charger, the wireless charger may have a plurality of discreet sets of magnetic wave parameters. Additionally, or alternatively, the wireless charger may be configured to vary magnetic waves in an analog pattern. The wireless charger may be in electrical communication with a power grid. The wireless charger may be configured to convert one of DC and AC electricity into magnetic waves. The wireless receiver may be configured to produce electricity of multiple phases from the magnetic waves received from the wireless charger. As such, the wireless receiver may have a plurality of receiver conductors. The wireless receiver may have a central phase receiver conductor, a leading phase receiver conductor, and a lagging phase receiver conductor. The wireless receiver may generate electrical current of 0° phase, +120° phase, and −120° phase. Additionally, the wireless receiver may have a neutral receiver conductor.

The power network may include a switchbox. The switchbox may define a switchbox housing. The switchbox may include a plurality of inputs and an output. The plurality of inputs may include a stationary charging input and a wireless charging input. As such, the stationary input may be in direct electrical communication with the charging interface, and the wireless charging input may be in direct electrical communication with the wireless receiver. The output may be in electrical communication with a vehicle battery. In some embodiments, the switchbox may include a plurality of outputs. For example, the switchbox may include a high-volt output and a low-volt output. In such embodiments, the high-volt charger may be configured to charge a traction battery, and the low-volt charger may be configured to charge a secondary battery.

The switchbox may include a plurality of relays. The plurality of relays may include a central phase relay, a leading phase relay, and a lagging phase relay. Additionally, the plurality of relays may include a neutral relay. Each of the relays of the plurality of relays may correspond to a set of conductors. In one embodiment, the central phase relay may be configured to interact with the central phase stationary conductor, the central phase interface conductor, and the central phase receiver conductor. The leading phase relay may be configured to interact with the leading phase stationary conductor, the leading phase interface conductor, and the leading phase receiver conductor. The lagging phase conductor may be configured to interact with the lagging phase stationary conductor, the lagging phase interface conductor, and the lagging phase receiver conductor.

Each of the relays of the plurality of relays may be configured to switch between a plurality of contact positions. Each of the relays of the plurality of relays may be configured to switch between a first contact position, a second contact position, a third contact position, and a fourth contact position. The first contact position may be configured to place a conductor of the plurality of interface conductors in direct electrical communication with a conductor of the plurality of charger conductors. For example, the first contact position may directly connect the central phase interface conductor and the central phase charger conductor. The second contact position may be configured to place a conductor of the plurality of receiver conductors in direct electrical communication with a conductor of the plurality of charger conductors. For example, the second contact position may directly connect the central phase receiver conductor and the central phase charger conductor. The third contact position may be configured to place a conductor of the plurality of interface conductors, and a conductor of the plurality of receiver conductors in direct electrical communication with a conductor of the plurality of charger conductors. For example, the first contact position may directly connect the central phase interface conductor and the central phase receiver conductor to the central phase charger conductor. The fourth contact position may be configured to remove a conductor of the plurality of interface conductors, and a conductor of the plurality of receiver conductors from direct electrical communication with a conductor of the plurality of charger conductors. For example, the first contact position may remove the direct connection of the central phase interface conductor or the central phase receiver conductor from the central phase charger conductor. The relays may be configured to switch between the plurality of contact positions in response to a command from a controller requesting a relay position.

The switchbox may include a plurality of electrical parameter sensors. In some embodiments, the plurality of electrical parameter sensors may be defined by a plurality of electrical current sensors. The plurality of electrical current sensors may include an interface electrical current sensor and a receiver electrical current sensor. The interface electrical current sensor may be configured to determine the electrical current value of electricity provided by the charging interface. As such, the interface electrical current sensor may be disposed on a conductor of the plurality of interface conductors, such as the central phase interface conductor. Similarly, the receiver electrical current sensor may be configured to determine the electrical value of electricity provided by the wireless receiver. As such, the receiver electrical current sensor may be disposed on a conductor of the plurality of receiver conductors, such as the central phase receiver conductor. Additionally, or alternatively, the plurality of electrical parameter sensors may be defined by a plurality of electrical phase sensors. The plurality of electrical phase sensors may include an interface electrical phase sensor and a receiver electrical phase sensor. The interface electrical phase sensor may be configured to determine the electrical phase value of electricity provided by the charging interface. As such, the interface electrical phase sensor may be disposed on a conductor of the plurality of interface conductors, such as the central phase interface conductor. Similarly, the receiver electrical phase sensor may be configured to determine the electrical value of electricity provided by the wireless receiver. As such, the receiver electrical phase sensor may be disposed on a conductor of the plurality of receiver conductors, such as the central phase receiver conductor. The plurality of electrical phase sensors may further define additional electrical phase sensors disposed on additional conductors for accuracy of phase monitoring.

The vehicle may comprise a controller. The controller may have a memory system and a processor. The memory system may be configured to store instruction sets such as programs, algorithms, methods, etc. The memory system may be further configured to receive, monitor, and store values presented to the controller. The processor may be configured to execute instruction sets. The controller may be configured to receive signals indicative of information from external sources including by not limited to sensors, devices, and other controllers. The controller may be configured to receive information by various ways including electrical communication and electrical-magnetic communication. The controller may be a vehicle controller. As such, the controller may be in communication with an engine, a vehicle battery, a drivetrain, an exhaust system, a generator, and a motor of a vehicle. The controller may further be in commutation with braking systems, including a regenerative braking system and a friction braking system. The controller may be configured to retrieve values from each of the components of a vehicle such as engine speed, battery SOC, vehicle torque, exhaust flow, and the conditions of a vehicle power network.

The controller may be in communication with the charging interface. The controller may be configured to receive a ready signal from at least one charging interface. The ready signal may be a low-voltage electrical signal. Additionally, or alternatively, the ready signal may be received wirelessly. In other embodiments, the controller may be configured to detect when a charging interface is ready by monitoring its available power value. The controller may be configured to receive a first ready signal from an interface electrical current sensor indicative of the first electrical current value of the charging interface. The controller may be configured to receive a second ready signal from a receiver electrical current sensor indicative of the second electrical current value of the wireless receiver. The controller may be configured to receive a first ready signal from an interface electrical phase sensor indicative of the electrical phase value of the charging interface The controller may be configured to receive a second ready signal from a receiver second electrical phase sensor indicative of the second electrical phase value of the wireless receiver. The controller may be programmed to send a command to the plurality of relays to switch between a plurality of contact positions.

In response to receiving a first ready signal from the first electrical current sensor determining presence of a first electrical current value at the first port, the controller may send a command to drive the plurality of relays to the first position. In response to receiving a second ready signal from the second electrical current sensor determining presence of a second electrical current value at the second port, the controller may send a command to drive the plurality of relays to the second position. The controller may be programmed to compare the first and second electrical current values determined by the first and second ready signal. The controller may be programmed to, in response to determining which of the first and second electrical current values is greater, send a command to drive the plurality of relays to one of the first and second positions, such that the greater of the first and second electrical current values is in electrical communication with the onboard charger.

In response to receiving a first ready signal from the first electrical phase sensor determining presence of a first electrical phase value at the first port, the controller may send a command to drive the plurality of relays to the first position. In response to receiving a second ready signal from the second electrical phase sensor determining presence of a second electrical phase value at the second port, the controller may send a command to drive the plurality of relays to the second position. The controller may be programmed to compare the first and second electrical phase values determined by the first and second ready signals. The controller may be programmed to, in response to determining the first electrical phase is within a predetermined phase range of the second electrical phase, send a command to drive the plurality of relays to a third position, in which both the wireless charger and the stationary charger are in electrical communication with the onboard charger.

FIG. 1 illustrates a vehicle 200. The vehicle 200 includes an engine 202, a traction battery 204, a motor 206, a generator 208, a drivetrain 222, a regenerative braking system 210, and a power network 212. The engine 202 is in mechanical communication with the drivetrain 222 and acts to provide torque to the drivetrain 222. The vehicle 200 also includes a controller 224. The controller 224 is configured to selectively operate many of the components of the vehicle 200. Further, the controller 224 is configured to receive signals from various sensors throughout the vehicle indicative of vehicle metrics, performance, status, among other things. The engine 202 is in mechanical communication with the generator 208. The generator 208 is in electrical communication with the power network 212, such that mechanical energy from the engine 202 is converted by the generator 208 into electrical energy to be provided to the power network 212. The traction battery 204 is in electrical communication with the power network 212 and may be charged by the engine 202 via the power network 212. The regenerative braking system 210 is further is electrical communication with the power network 212. The power network 212 is configured to convert inertia from the vehicle 200 into electrical energy. The regenerative braking system 210 may charge the traction battery 204 via the power network 212 from the converted inertia. The motor 206 is in electrical communication with the power network 212. The motor 206 is configured to fulfill propulsion requests to the vehicle 200 using energy for the traction battery 204 via the power network 212.

The power network 212 includes a high voltage bus network 214, a low voltage bus network 216, and a converter 218. The high voltage bus network 214 is in electrical communication with the traction battery 204. The low voltage bus network 216 is used to fulfill electrical energy requests for the vehicle load 226. Such requests include audio and climate control requests. The high voltage bus network 214 is in electrical communication with the low voltage bus network 216 via the converter 218. The power network 212 further includes a charging circuit 220 in electrical communication with the traction battery 204 via the power network 212. The charging circuit 220 is configured to provide electrical energy to the power network 212 from external sources.

Figure 2:
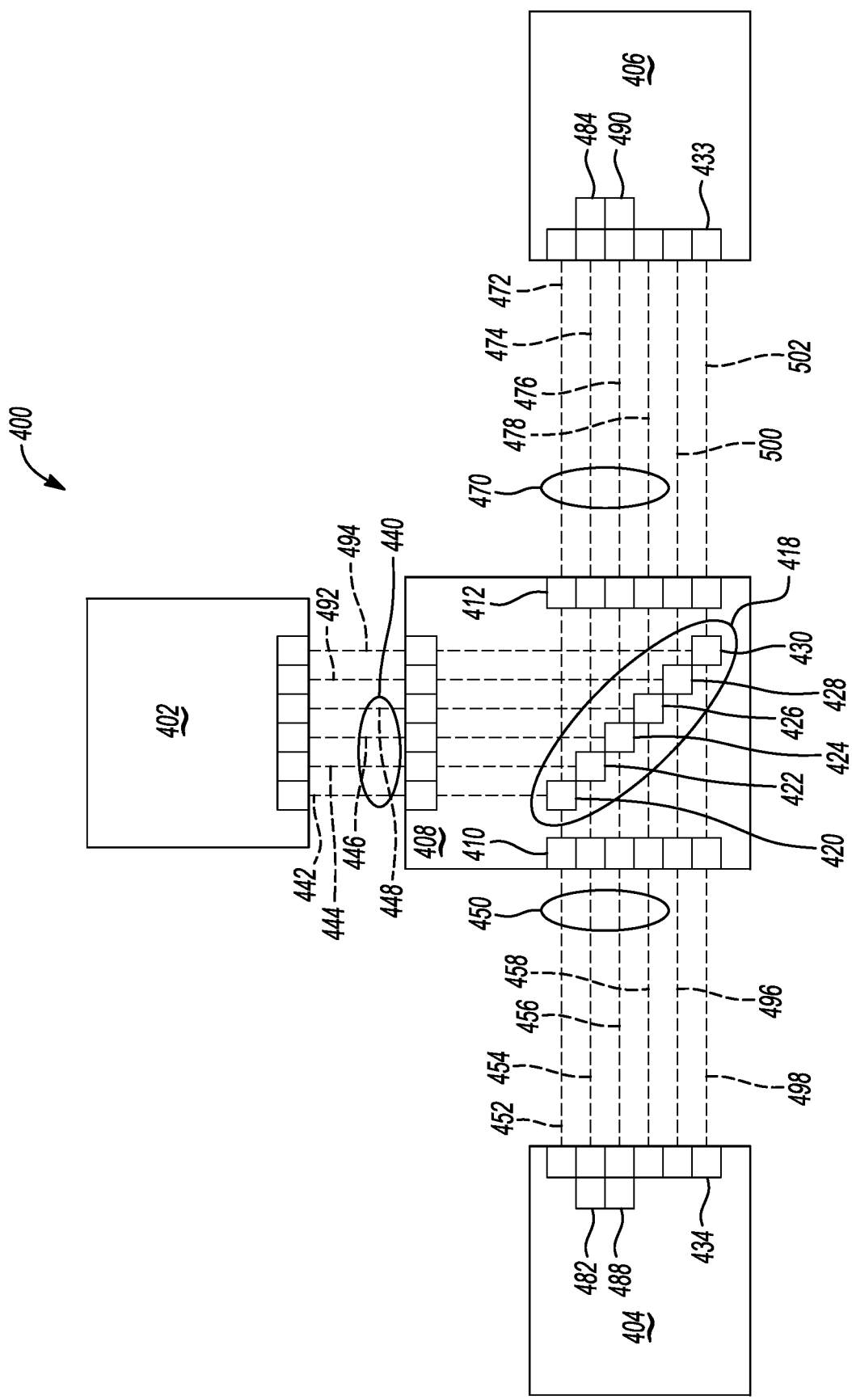
FIG. 2 illustrates a first charging circuit.

FIG. 2 illustrates a first charging circuit 400. The first charging circuit 400 includes an onboard charger 402. The onboard charger 402 is configured to receive electrical energy from at least one of a stationary charger 404 and a wireless charger 406. In some embodiments of the first charging circuit 400, the charger 406 may be a stationary charger. Similarly, the stationary charger 404 may be a wireless charger. The onboard charger 402 includes a plurality of charger conductors 440. The plurality of charger conductors 440 includes a central phase charger conductor 442, a leading phase charger conductor 444, a lagging phase charger conductor 446, and a neutral charger conductor 448. The onboard charger 402 is in electrical communication with the at least one of the stationary charger 404 and the wireless charger 406 via a switchbox housing 408. The switchbox housing 408 includes a first port 410, and a second port 412. The first port 410 is configured to interact with the stationary charger 404. As such, the first port 410 is configured to be in electrical communication with the stationary charger 404 via a charging interface 434. The charging interface 434 has a plurality of interface conductors 450. The plurality of interface conductors 450 includes a central phase interface conductor 452, a leading phase interface conductor 454, a lagging phase interface conductor 456, and a neutral interface conductor 458. The second port 412 is configured to interact with the wireless charger 406. As such, the second port 412 is configured to be in electrical communication with the wireless charger 406 via a wireless receiver 433. The wireless receiver 433 includes a plurality of receiver conductors 470. The plurality of receiver conductors 470 includes a central phase receiver conductor 472, a leading phase receiver conductor 474, a lagging phase receiver conductor 476, and a neutral receiver conductor 478.

The switchbox housing 408 includes a plurality of relays 418. The plurality of relays 418 has a first relay 420, a second relay 422, a third relay 424, a fourth relay 426, a fifth relay 428, and a sixth relay 430. The first relay 420 is configured to removably connect the central phase charger conductor 442 to at least one of the central phase interface conductor 452 and central phase receiver conductor 472. The second relay 422 is configured to removably connect the leading phase charger conductor 444 to at least one of the leading phase interface conductor 454 and leading phase receiver conductor 474. The third relay 424 is configured to removably connect the lagging phase charger conductor 446 to at least one of the lagging phase interface conductor 456 and lagging phase receiver conductor 476. The fourth relay 426 is configured to removably connect the neutral charger conductor 448 to at least one of the neutral interface conductor 458 and neutral receiver conductor 478. The fifth relay 428 is configured to removably connect a first charger low-voltage conductor 492 to at least one of a first interface low-voltage conductor 496 and a first wireless low-voltage conductor 500. The sixth relay 430 is configured to removably connect a second charger low-voltage conductor 494 to at least one of a second interface low-voltage conductor 498 and a second wireless low-voltage conductor 502.

The first charging circuit 400 further includes an interface electrical current sensor 482 and a receiver electrical current sensor 484. The interface electrical current sensor 482 and the receiver electrical current sensor 484 may send a signal to the controller 224 indicative of an electrical current value at one of the wireless receiver 433 and charging interface 434. The first charging circuit 400 also includes an interface electrical phase sensor 488 and a receiver electrical phase sensor 490. The interface electrical phase sensor 488 and receiver electrical phase sensor 490 may send a signal to the controller 224 indicative of an electrical phase value at one of the wireless receiver 433 and charging interface 434.

The first charging circuit 400 may be configured to provide electrical charge to the traction battery 204 in various configurations. In a first configuration, the onboard charger 402 may be configured to receive electrical charge from the stationary charger 404 and not receive electrical charge from the wireless charger 406. In this configuration, the plurality of relays 418 may be in a first position in which the plurality of stationary conductors 450 are in electrical communication with the plurality of charger conductors 440, while the plurality of receiver conductors 470 are isolated from the plurality of charger conductors 440. The first charging circuit 400 may be set to this first configuration in the event that an electrical parameter of a predetermined value is detected at the stationary charger 404, while an electrical parameter of a predetermined value is not detected at the wireless charger 406. Additionally, or alternatively, the first charging circuit 400 may be set to this first configuration in the event that that an electrical parameter value detected at stationary charger 404 is greater than a detected electrical parameter value of wireless charger 406. A second configuration may be in which the onboard charger 402 is configured to receive electrical charge from the wireless charger 406 and not the stationary charger 404. Similar to the first configuration, the first charging circuit 400 may be set to the second configuration in the event that an electrical predetermined value is detected at wireless charger 406 while not being detected at the stationary charger 404. Further, the first charging circuit 400 may be set to the second configuration if a detected electrical value of the wireless charger 406 is greater than a detected electrical value of the stationary charger 404. A third configuration is one in which the onboard charger 402 is configured to receive electrical charge from both the stationary charger 404 and the wireless charger 406. In this configuration, the plurality of relays 418 may be in a second position in which the plurality of receiver conductors 470 are in electrical communication with the plurality of charger conductors 440, while the plurality of stationary conductors 450 are isolated from the plurality of charger conductors 440. In this configuration, the plurality of relays 418 may be in a third position in which both the plurality of stationary conductors 450 and plurality of receiver conductors 470 are in electrical communication with the plurality of charger conductors 440. The first charging circuit 400 may be set to the third configuration in the event that the stationary charger 404 has a detected electrical parameter of a predetermined value, and the wireless charger 406 has a detected electrical parameter of a predetermined value, and the electrical patterns from the stationary charger 404 and the wireless charger 406 are compatible. Such an electrical parameter may be electrical phase.

Figure 3:
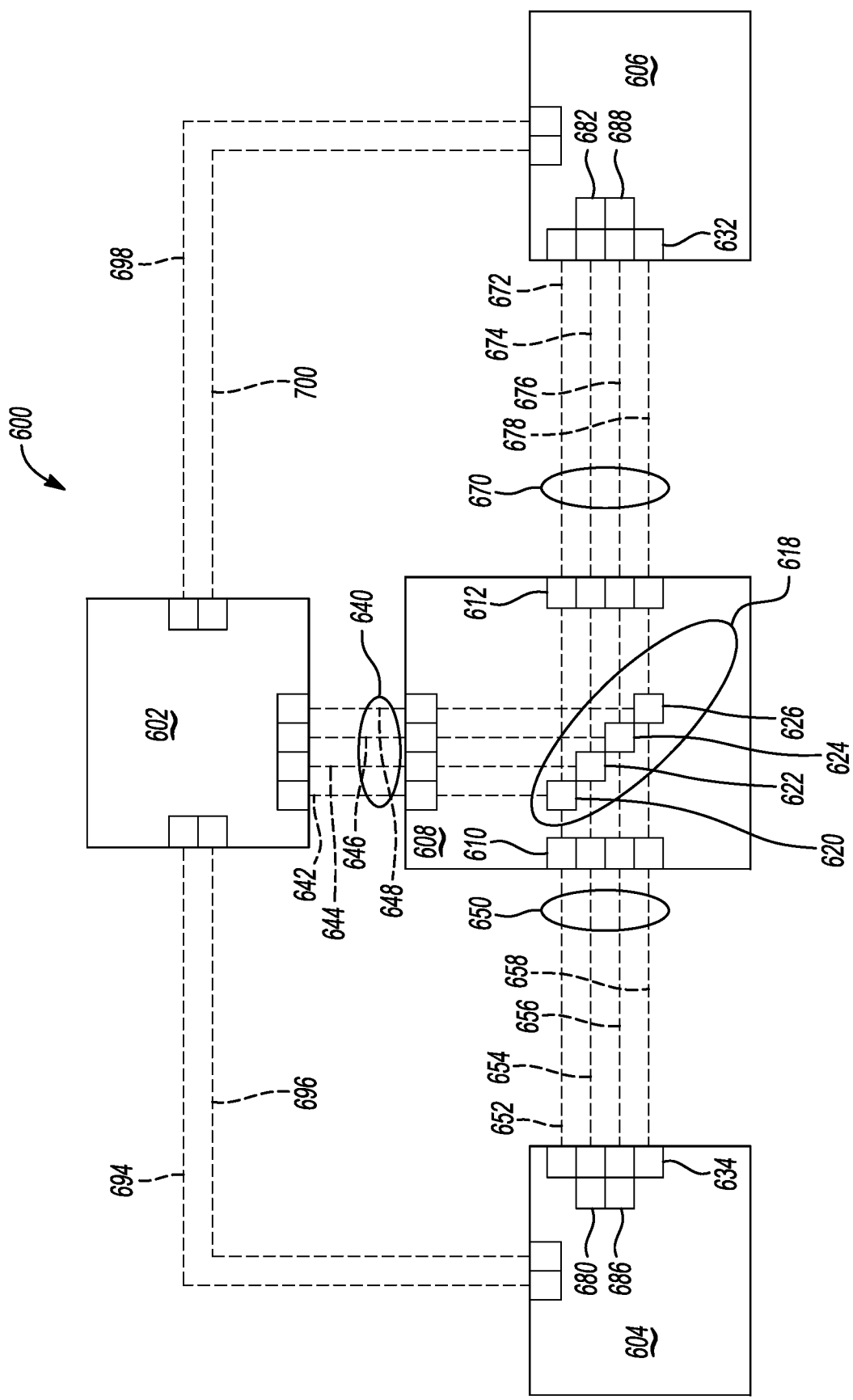
FIG. 3 illustrates a second charging circuit.

FIG. 3 illustrates a second charging circuit 600. The second charging circuit 600 includes an onboard charger 602. The onboard charger 602 is configured to receive electrical energy from at least one of a stationary charger 604 and a wireless charger 606. In some embodiments of the first charging circuit 600, the charger 606 may be a stationary charger. Similarly, the stationary charger 604 may be a wireless charger. The onboard charger 602 includes a plurality of charger conductors 640. The plurality of charger conductors 640 includes a central phase charger conductor 642, a leading phase charger conductor 644, a lagging phase charger conductor 646, and a neutral charger conductor 648. The onboard charger 602 is in electrical communication with the at least one of the stationary charger 604 and the wireless charger 606 via a switchbox housing 608. The switchbox housing 608 includes a first port 610 and a second port 612. The first port 610 is configured to interact with the stationary charger 604. As such, the first port 610 is configured to be in electrical communication with a stationary charger 604 via a charging interface 634. The charging interface 634 has a plurality of interface conductors 650. The plurality of interface conductors 650 includes a central phase interface conductor 652, a leading phase interface conductor 654, a lagging phase interface conductor 656, and a neutral interface conductor 658. The second port 612 is configured to interact with the wireless charger 606. As such, the second port 612 is configured to be in electrical communication with the wireless charger 606 via a wireless receiver 632. The wireless receiver 632 includes a plurality of receiver conductors 670. The plurality of receiver conductors 670 includes a central phase receiver conductor 672, a leading phase receiver conductor 674, a lagging phase receiver conductor 676, and a neutral receiver conductor 678.

The switchbox housing 608 includes a plurality of relays 618. The plurality of relays 618 has a first relay 620, a second relay 622, a third relay 624, and a fourth relay 626. The first relay 620 is configured to removably connect the central phase charger conductor 642 to at least one of the central phase interface conductor 652 and central phase receiver conductor 672. The second relay 622 is configured to removably connect the leading phase charger conductor 644 to at least one of the leading phase interface conductor 654 and leading phase receiver conductor 674. The third relay 622 is configured to removably connect the lagging phase charger conductor 646 to at least one of the lagging phase interface conductor 656 and lagging phase receiver conductor 676. The fourth relay 626 is configured to removably connect the neutral charger conductor 648 to at least one of the neutral interface conductor 658 and neutral receiver conductor 678. A first interface low-voltage conductor 694 and a first wireless low-voltage conductor 698 are directly connected to the onboard charger 602. Similarly, a second interface low-voltage conductor 696 and a second wireless low-voltage conductor 700 are directly connected to the onboard charger 602.

The second charging circuit 600 further includes an interface electrical current sensor 680, a receiver electrical current sensor 682. The interface electrical current sensor 680 and the receiver electrical current sensor 682 may send a signal to the controller 224 indicative of an electrical current value at one of the wireless receiver 632 and charging interface 634. The second charging circuit 600 also includes an interface electrical phase sensor 686 and a receiver electrical phase sensor 688. The interface electrical phase sensor 686 and receiver electrical phase sensor 688 may send a signal to the controller 224 indicative of an electrical phase value at one of the wireless receiver 632 and charging interface 634.

The second charging circuit 600 may be configured to provide electrical charge to the traction battery 204 in various configurations. In a first configuration, the onboard charger 602 may be configured to receive electrical charge from the stationary charger 604 and not receive electrical charge from the wireless charger 606. In this configuration, the plurality of relays 618 may be in a first position in which the plurality of stationary conductors 650 are in electrical communication with the plurality of charger conductors 640, while the plurality of receiver conductors 670 are isolated from the plurality of charger conductors 640. The second charging circuit 600 may be set to this first configuration in the event that an electrical parameter of a predetermined value is detected at the stationary charger 604, while an electrical parameter of a predetermined value is not detected at the wireless charger 606. Additionally, or alternatively, the second charging circuit 600 may be set to this first configuration in the event that that an electrical parameter value detected at stationary charger 604 is greater than a detected electrical parameter value of wireless charger 606. A second configuration may be in which the onboard charger 602 is configured to receive electrical charge from the wireless charger 606 and not the stationary charger 604. Similar to the first configuration, the second charging circuit 600 may be set to the second configuration in the event that an electrical predetermined value is detected at wireless charger 606 while not being detected at the stationary charger 604. Further, the second charging circuit 600 may be set to the second configuration if a detected electrical value of the wireless charger 606 is greater than a detected electrical value of the stationary charger 604. A third configuration is one in which the onboard charger 602 is configured to receive electrical charge from both the stationary charger 604 and the wireless charger 606. In this configuration, the plurality of relays 618 may be in a second position in which the plurality of receiver conductors 670 are in electrical communication with the plurality of charger conductors 640, while the plurality of stationary conductors 650 are isolated from the plurality of charger conductors 640. In this configuration, the plurality of relays 618 may be in a third position in which both the plurality of stationary conductors 650 and plurality of receiver conductors 670 are in electrical communication with the plurality of charger conductors 640. The second charging circuit 600 may be set to the third configuration in the event that the stationary charger 604 has a detected electrical parameter of a predetermined value, and the wireless charger 606 has a detected electrical parameter of a predetermined value, and the electrical patterns from the stationary charger 604 and the wireless charger 606 are compatible. Such an electrical parameter may be electrical phase.

Figure 4:
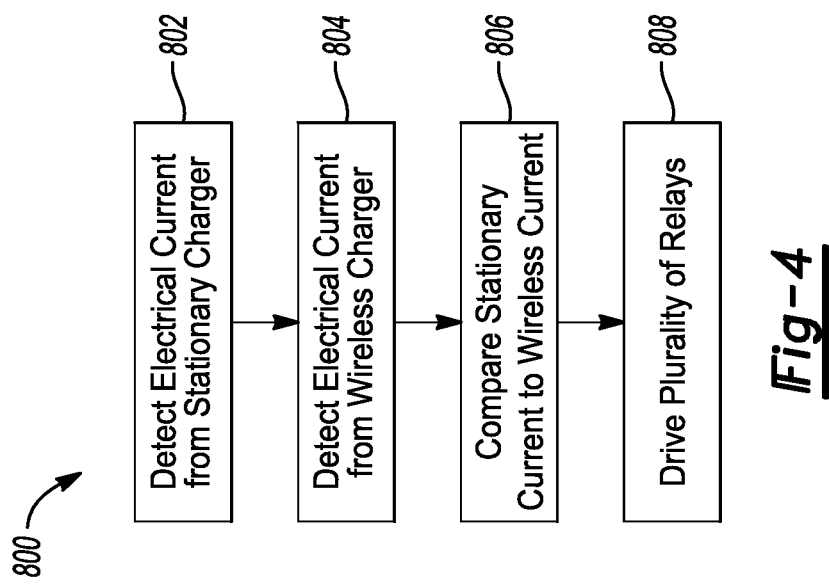
FIG. 4 illustrates a first charging algorithm.

FIG. 4 illustrates a first charging algorithm 800. The first charging algorithm 800 starts with a detect stationary charging step 802, in which the controller 224 determines if there is any electrical current from a stationary charger 404. Next, the first charging algorithm 800 moves to a detect wireless charging step 804, in which the controller 224 determines if there is any electrical current for a wireless charger 406. Next, in a compare charging values step 806, the controller 224 compares the electrical current of the stationary charger 404 and the wireless charger 406. In a drive relay step 808, the controller commands the plurality of relays 418 to connect the plurality of charger conductors 440 to at least one of the plurality of interface conductors 450 and the plurality of receiver conductors 470 having the greater electrical current.

Figure 5:
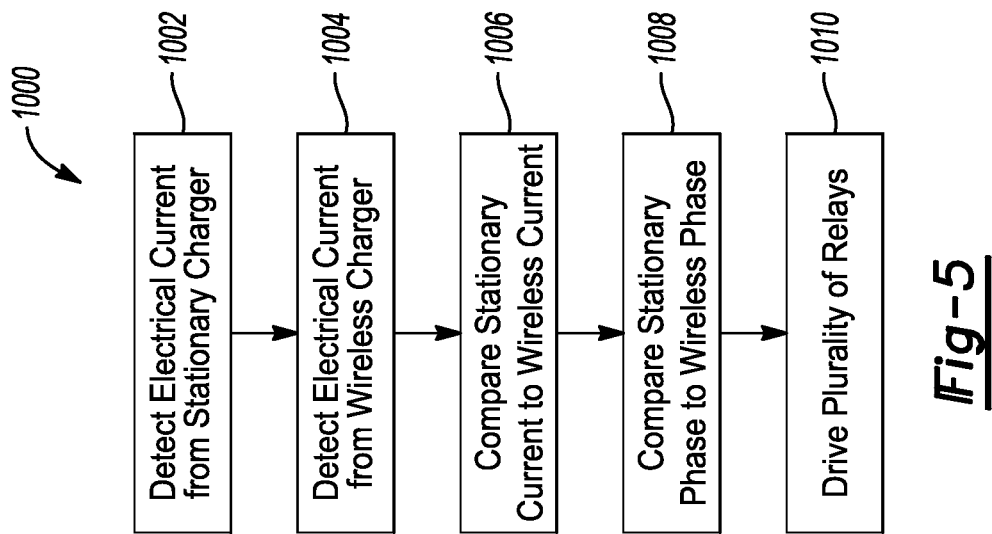
FIG. 5 illustrates a second charging algorithm.

FIG. 5 illustrates a second charging algorithm 1000. The second charging algorithm 1000 starts with a detect stationary charging step 1002, in which the controller 224 determines if there is any electrical current from a stationary charger 404. Next, the second charging algorithm 1000 moves to a detect wireless charging step 1004, in which the controller 224 determines if there is any electrical current for a wireless charger 406. Next, in a compare charging values step 1006, the controller 224 compares the electrical current of the stationary charger 404 and the wireless charger 406. The second charging algorithm 1000 then compares the phases of the electrical current of the stationary charger 404 and wireless charger 406. In a drive relay step 1010, the controller commands the plurality of relays 418 to connect the plurality of charger conductors 440 to at least one of the plurality of interface conductors 450 and the plurality of receiver conductors 470 having the greater electrical current, unless the phase differential of the stationary charger 404 and wireless charger 406 are below a certain threshold, in which the controller 224 will command the plurality of relays 418 to connect the plurality of charger conductors 440 to both the plurality of interface conductors 450 and the plurality of receiver conductors 470.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle charge system comprising:
   an electrical bus defining first and second ports;
   a plurality of relays;
   a traction battery in electrical communication with the electrical bus; and
   a controller programmed to,
      during presence of a first ready signal at the first port, drive the plurality of relays to a first position such that the traction battery receives current from the first port via the electrical bus and not the second port,
      during presence of a second ready signal at the second port, drive the plurality of relays to a second position such that the traction battery receives current from the second port via the electrical bus and not the first port, and
      responsive to presence of current at the first and second ports, drive the plurality of relays to one of the first position and second position according to which of the first and second ports can provide greater power.

2. The system of claim 1, wherein the controller is further programmed to determine which of the first electrical and second port has a greater electrical power and drive the plurality of relays to one of the first position and second position corresponding to the port having the greater electrical power.

3. The system of claim 1, wherein the first port is configured to convert magnetic flux into electrical current.

4. The system of claim 1, further comprising a switch housing, wherein the first port, second port, relays, and controller are disposed within the switch housing.

5. The system of claim 1, wherein the controller is further programmed to monitor a first phase value of the first electrical current, and a second phase value of the second electrical current, and in response to a difference between the first phase value and the second phase value being below a predetermined phase differential value, drive the plurality of relays to a third position in which the electrical bus is in electrical communication with both the first port and the second port at a same time.

6. A method comprising:
   responsive to presence of a first ready signal at a first electrical port, drive a plurality of relays to a first position such that a traction battery receives current from the first electrical port via an electric bus;
   responsive to presence of a second ready signal at a second electrical port, drive the plurality of relays to a second position such that the traction battery receives current from the second electrical port via the electric bus and not the first electrical port; and
   responsive to presence of current at the first and second electrical ports, drive the relays to one of the first and second positions according to which of the first and second electrical ports can provide greater power.

7. The method of claim 6 further comprising converting magnetic flux into electrical current.

8. The method of claim 6 further comprising, responsive to a difference in phase in the current at the first electrical port and the current at the second electrical port being less than a threshold, drive the relays to a third position such that the traction battery receives current from the first electrical port and the second electrical port.

9. An automotive control system comprising:
   an automotive controller programmed to
      drive a plurality of relays to a first position or a second position depending on which of a first port and second port, that are both arranged to provide electrical power, has greater electrical power such that a traction battery receives current from the one of the first port and second port delivering the greater electrical power but not the other of the first port and second port, and
      drive the relays to a third position such that the traction battery receives current from both the first port and the second port when a difference in phase between the current at the first port and the current at the second port is less than a predetermined threshold.

10. The automotive control system of claim 9, wherein the controller is further programmed to drive the relays to the first position during presence of a first ready signal at the first port and absence of current at the second port.

11. The automotive control system of claim 9, wherein the controller is further programmed to drive the relays to the second position during presence of a second ready signal at the second port and absence of current at the first port.

12. The automotive control system of claim 9, wherein the first port is configured to convert magnetic flux into electrical current.

13. The automotive control system of claim 9, further comprising a switch housing, wherein the first port, second port, relays, and controller are disposed within the switch housing.

* * * * *